United States Patent
Kaushik et al.

(10) Patent No.: US 10,565,391 B2
(45) Date of Patent: Feb. 18, 2020

(54) EXPRESSION EVALUATION OF DATABASE STATEMENTS FOR RESTRICTED DATA

(71) Applicant: Microsoft Technology Licensing, LLC, Redmond, WA (US)

(72) Inventors: Raghav Kaushik, Kirkland, WA (US); Aditya Nigam, Kirkland, WA (US); Arvind Arasu, Redmond, WA (US); Donald Alan Kossmann, Kirkland, WA (US); Kenneth Eguro, Seattle, WA (US); Nikhil Vithlani, Seattle, WA (US); Panagiotis Antonopoulos, Redmond, WA (US); Ravi Ramamurthy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 15/612,865

(22) Filed: Jun. 2, 2017

(65) Prior Publication Data

US 2018/0349627 A1    Dec. 6, 2018

(51) Int. Cl.
| | |
|---|---|
| *H04L 9/00* | (2006.01) |
| *G06F 21/62* | (2013.01) |
| *H04L 9/06* | (2006.01) |

(52) U.S. Cl.
CPC ...... *G06F 21/6218* (2013.01); *G06F 21/6227* (2013.01); *H04L 9/0643* (2013.01)

(58) Field of Classification Search
CPC ............. G06F 21/6227; G06F 21/6218; G06F 16/284; G06F 16/2455; G06F 16/21; G06F 16/00
See application file for complete search history.

(56) References Cited

U.S. PATENT DOCUMENTS

| | | | |
|---|---|---|---|
| 2013/0191650 A1* | 7/2013 | Balakrishnan ...... | G06F 21/6227 713/190 |
| 2013/0246796 A1* | 9/2013 | Lichtenstadt ....... | G06F 21/6227 713/176 |
| 2016/0182470 A1 | 6/2016 | Rubin et al. | |

FOREIGN PATENT DOCUMENTS

EP    2731040 A1    5/2014

OTHER PUBLICATIONS

"International Search Report and Written Opinion Issued in PCT Application No. PCT/US18/034976", dated Jul. 24, 2018, 10 Pages.

* cited by examiner

*Primary Examiner* — Alexander Lagor
(74) *Attorney, Agent, or Firm* — Liang IP, PLLC

(57) ABSTRACT

Computer systems, devices, and associated methods of evaluating an expression comprising restricted data are disclosed herein. In one embodiment, a method includes receiving a database statement from a client application and verifying the authenticity of the database statement. If the database statement is authentic, an approved expression is identified in the database statement for creating an evaluation rule. The method further includes restricting evaluation of expressions in a protected computing environment according to the created evaluation rule.

20 Claims, 9 Drawing Sheets

EXPRESSION EVALUATION OF DATABASE STATEMENTS FOR RESTRICTED DATA

BACKGROUND

Companies, government entities, or other types of organizations often utilize databases hosted on remote database servers to store records of information to provide easy access or other desired user experiences. Some of the stored records may contain personal, sensitive, or otherwise restricted information. For example, a financial website can store records of customer names, social security numbers, addresses, phone number, birthdays, or other personal information. Malware software and/or hackers frequently target the databases hosted on such remote database servers for unauthorized access to such restricted information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Column-level encryption is a security technique involving encryption of data in individual columns of a table in a database. According to the technique, an application, user, or entity can encrypt data of restricted information prior to transmitting the data to a remote database server (e.g., a Structured Query Language ("SQL") server) for storage. The cryptographic keys used to encrypt/decrypt the data are not revealed to the remote database server at which the encrypted data is stored. Accordingly, even when an unauthorized entity gains access to the remote database server, the unauthorized entity may only find encrypted data in the database. As such, the restricted information may be protected.

Even though column-level encryption can provide security to the stored records of restricted information, database operations that may be performed on the encrypted data can be rather limited. In certain implementations, data of restricted information can be encrypted using deterministic or probabilistic encryption. According to deterministic encryption, a set of original data encrypted with a cryptographic key according to a selected encryption heuristics always results in the same encrypted data. On the other hand, according to probabilistic encryption, a set of original data encrypted with an encryption key according to a selected encryption algorithm may result in different encrypted data. A database server cannot perform operations on stored data encrypted according to a probabilistic encryption scheme. Performing database operations on data encrypted according to a deterministic encryption scheme is limited to only simple operations such as equality and equijoin.

To perform a more robust set of database operations on the encrypted data, a database server can offload processing of encrypted data to a protected processing environment. In the protected processing environment, expression evaluation or other suitable database operations can be performed on the encrypted data in a decrypted state without exposing the encrypted data to higher-level processes on the same database server. Examples of a protected processing environment can be provided by software guard extensions that can include a set of instructions that allow user-level code to allocate private regions of memory that is protected from higher-level processes. One example software guard extension is the Intel SGX provided by Intel Corporation of Santa Clara, Calif. Thus, a higher-level process such as a hypervisor or operating system would not have access to any decrypted data in the allocated private regions of the memory on the database server.

The database server can thus be logically divided into a trusted machine operating in a protected processing environment and an untrusted machine that is connected to a data store. When the untrusted machine running, for example, an SQL server, receives a database statement that requires processing of encrypted data from a client application, the SQL server in the untrusted machine can retrieve records of the encrypted data from the connected data store. The SQL server can then transmit at least a portion of the database statement and encrypted data to a trusted machine for further processing. For example, the retrieved encrypted data may include an encrypted string representing a social security number of a customer, and the portion of the database statement includes another encrypted string representing another social security number. The trusted machine can include components configured to decrypt the encrypted data and to perform expression evaluation or other database operations on the decrypted data in the protected processing environment. For instance, the trusted machine can compare and determine whether the encrypted data retrieved from the data store and the encrypted string contained in the database statement represent the same social security number. The trusted machine can then provide processing results (e.g., a Boolean value indicating a match or mismatch) to the SQL server in the untrusted machine for performing additional database operations.

Although plaintext or unencrypted data is never exposed to the SQL server in the untrusted machine, an unauthorized party having access to the untrusted machine (e.g., an administrator or malware) can learn certain information about the encrypted data processed by the trusted machine. For example, when the trusted machine compares the two encrypted strings of social security numbers, an observer at the untrusted machine can learn whether the two encrypted strings are the same. Able to learn information about the encrypted data, a malicious actor at the untrusted machine may modify database statements or create database statements not requested by a client application, and request the trusted machine for evaluation or execution of such database statements. Execution of such database statements may cause damage to data integrity to the restricted data in the database or cause other undesirable effects.

Several embodiments of the disclosed technology can at least reduce or even prevent the risk of executing unauthorized database statements at the trusted machine by implementing a compiler in the trusted machine to restrict expressions or types of expressions that a statement processor is permitted to evaluate. In certain implementations, the compiler can be configured to receive a database statement having a digital signature signed by a client application that generated and/or submitted the database statement. In other embodiments, the database statement can also include metadata associated with the database statement, including, for example, one or more column names or key names, and the metadata can be digitally signed as well. Upon receiving the database statement, the compiler can verify the attached digital signature to ensure that the database statement (and any metadata) as received at the trusted machine has not been tampered with after submission by the client application. In response to determining that the received database statement and associated metadata have not been tampered with, the compiler can be configured to identify at least one expression or all expressions (or one or more types thereof) included in the database statement as approved by the client application.

The compiler can then create one or more expression rules for the statement processor at the trusted machine to abide by. The expression rule indicates to the statement processor at the trusted machine at least one expression or expression type containing one or more database operations the trusted machine is permitted to execute. When the statement processor at the trusted machine receives a request from the SQL server at the untrusted machine for evaluation of an expression, the statement processor at the trusted machine can determine whether the received expression meets the expression rule. For example, an expression rule may include an operator (e.g., compare) that is permitted to be run on the encrypted data. In response to determining that the expression satisfies the expression rule, the statement processor can proceed with evaluating the expression. The statement processor can then generate an expression result, which is then returned to the SQL server. The SQL server at the untrusted machine can then perform additional operations on the received database statement, such as recording the received expression result in the database or transmitting the same to the client application. On the other hand, in response to determining that the expression does not satisfy the expression rule, the statement processor may ignore the requested evaluation, raise an alarm, or perform other suitable operations.

Several embodiments of the disclosed technology can thus at least reduce or even prevent performance of unauthorized operations on encrypted data in the trusted machine by evaluating authenticity of the received database statement. Unlike in other database systems, the statement processor at the trusted machine does not evaluate all expressions received from the untrusted machine. Instead, the compiler can verify that a received database statement is authentic based on, for instance, a digital signature (e.g., a hash code) associated with the database statement. By evaluating the digital signature, the compiler can then indicate to the statement processor whether to evaluate certain expressions in association with the database statement. As such, the statement processor may avoid processing unauthorized expressions or commands to the encrypted data, thus improving data security in the database.

DETAILED DESCRIPTION

Figure 1A:
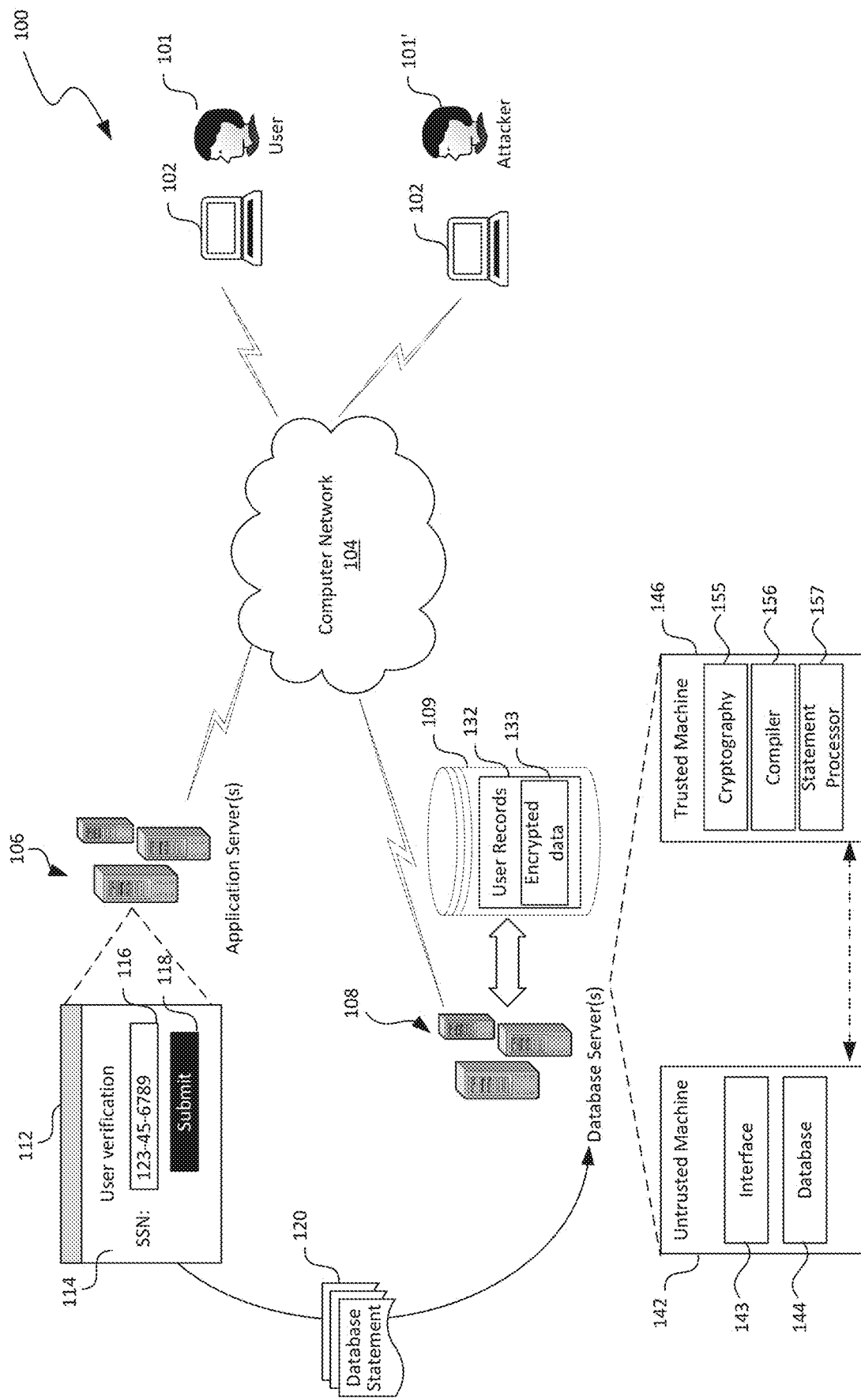
FIGS. 1A-1F are schematic diagrams illustrating a computing system implementing expression evaluation regulation during stages of operation in accordance with embodiments of the disclosed technology.

Certain embodiments of systems, devices, components, modules, routines, data structures, and processes for regulating expression evaluation by a trusted machine are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-4.

As used herein, the term "database statement" generally refers to a structured statement executable in a database for performing certain requested action(s). For instance, a database statement can request retrieval of certain records in a database based on one or more queries. A database statement may include, or derivable therefrom, one or more expressions. Also used herein, the term "expression" generally refers to a combination of values, operators, and functions that evaluate to a value (e.g., a scalar value). One example expression can include a predicate in a database statement. For instance, the following is an example SQL statement:

UPDATE accounts SET balance=balance*1.025
    WHERE account_age>5;

As shown above, the example database statement includes an expression, "balance*1.025," and a predicate, "account_age>5." Evaluating the example expression includes computing a value for rows of column balance, and evaluating whether a value for column account_age is greater than a value of 5, which results in a Boolean value for each comparison of the predicate.

As used herein, the term "protected processing environment" generally refers to a secure mode of processing data such that data being processed and information related to the processing is not revealed to other processes, including processes running at a higher privilege level on the same server or other suitable types of computing device. One example of a protected processing environment can be provided by software guard extensions such as Intel SGX provided by Intel Corporation of Santa Clara, Calif. As another example, a protected processing environment may comprise a Virtual Secure Mode (VSM) that is segregated from an operating system of a server by a hypervisor that sits on a hardware layer of the server.

Also used herein, "parsing" a database statement generally refers to examining characters in a database statement and recognizing commands, string literals, and comments by detecting keywords and identifiers and matching an overall structure of the database statement to a set of syntax rules applicable to the database. As used herein, "compiling" a database statement generally refers to parsing a database statement to identify expressions, including predicates and other elements of the database statement for evaluation. The expressions can be included in the database statement or derived from the database statement. For example, compiling a database statement may include identifying queries and subqueries in a database statement.

As used herein, an "approved" expression (or expression type) generally refers to an expression (or expression type) of a database statement whose authenticity has been or can be established. As used herein, the term "untrusted expression" generally refers to an expression that a trusted machine has been requested by an untrusted machine to evaluate. As used herein, the term "restricted data" generally refers to data that is to be encrypted for transmission and storage. For example, restricted data may be encrypted using cryptographic keys that are unavailable to an untrusted machine but available to an application and a trusted machine. For example, certain types of data may be restricted, including personal information (e.g., social security numbers), financial data, or other private data. As used herein, the term "cryptographic key" generally refers to a piece of information, such as a string of bits, used to transform plaintext into ciphertext, and vice versa, thus encrypting or decrypting data. A cryptographic key can be symmetric or asymmetric depending on the implementation. As used herein, the term "superkey" generally refers to a set of attributes within a table whose values can be used to uniquely identify a tuple. For example, a database server can identify information in a database table using a superkey, including for the purpose of accessing or updating the information or restricting expression evaluation to the information. As used herein, the term "content" of an expression generally refers to data included in an expression of a database statement or referenced by the expression, and data retrieved from a database, used for evaluation of the expression. For example, in the example database statement above, content of the expression includes a value for "balance." As used herein, the term "encrypted content" of an expression generally refers to content of an expression that is encrypted.

FIGS. 1A-1F are schematic diagrams illustrating a computing system 100 implementing expression evaluation regulation during stages of operation in accordance with embodiments of the disclosed technology. As shown in FIG. 1A, the computing system 100 can include an application server 106, a database server 108, multiple client devices 102 interconnected by a computer network 104. The computer network 104 can include an enterprise intranet, a wide area network, the Internet, or other suitable types of network.

FIGS. 1A-1F illustrate certain hardware/software components of the database server 108 in accordance with embodiments of the disclosed technology. In FIGS. 1A-1F, and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Even though particular components and associated arrangements of the computing system 100 are shown in FIGS. 1A-1F, in other embodiments, the computing system 100 can include additional and/or different components. For example, in certain embodiments, the application server 106 and the database server 108 can be interconnected via another computer network (not shown), contain multiple servers, and/or be integrated into a single computing facility. In other embodiments, the computing system 100 can also include caching servers, load balancers, or other suitable components.

In the description below, techniques of regulating expression evaluation are described as implemented on the database server 108 for illustration purposes. In other embodiments, some or all of the techniques disclosed herein can also be implemented on one or more other servers in the computing system 100. For example, some or all of the techniques disclosed herein may be implemented on a proxy server (not shown) interconnected between the application server 106 and the database server 108 via the computer network 104.

The client devices 102 can individually include a computing device that facilitates access to the application server 106 via the computer network 104 by users 101 (identified as a user 101 and an attacker 101'). In the illustrative embodiment, the client devices 102 include laptop computers. In other embodiments, the client devices 102 can also include smartphones or other suitable computing devices. Even though two users 101 are shown in FIGS. 1A-1E for illustration purposes, in other embodiments, the computing system 100 can facilitate any suitable number of users 101 to access the application server 106 via the computer network 104.

The application server 106 can be configured to execute one or more applications 112 configured to facilitate retrieving or otherwise interacting with records (e.g., user records 132) in a database 109 provided by the database server 108. In the illustrated embodiment, the application 112 includes components configured to create a database statement 120 for accessing data in the database 109 based on user input to, for example, locate a user record 132 in the database 109. The application 112 is configured to provide a user interface, for example, a webpage 114 to the user 101 upon request. In the illustrated example in FIG. 1A, the webpage 114 contains an input field 116 and a submit button 118. The input field 116 can be configured to receive a user input containing a numerical or other suitable types of value, for example, a string of "123-45-6789" in FIG. 1A. In other embodiments, the application 112 can also include an electronic commerce application, online financial exchange, or other suitable types of application.

In the illustrated example in FIG. 1A, upon actuation of the submit button 118 by the user 101, the application 112 can be configured to generate a signed database statement 120 based on the received user input (e.g., "123-45-6789") in the input field 116. For example, the application 112 may comprise a database driver (not shown) that is configured to generate the database statement 120 that includes instructions for the database server 108 to process, requesting user records associated with the received user input, or perform other suitable actions. The database statement 120 can include database commands, the user input, and a digital signature generated by or associated with the application 112. In some embodiments, the database statement 120 includes metadata for the database statement 120. For example, metadata for the database statement may comprise a column name or a superkey name in the database 109. The metadata for the database statement 120 can also be signed. For example, the digital signature of the database statement may be used for verifying the authenticity of the database statement and the metadata jointly.

The application 112 can also be configured to parameterize an object submitted in the input field 116 in the database statement 120. For instance, in the example shown in FIG. 1A, the database statement 120 may comprise a SQL statement for requesting user records associated with social security number "123-45-6789," which may be represented as follows:

select*from users where ssn like @x;

@x=123-45-6789;

where the restricted value, "123-45-6789" can be encrypted by a cryptography module (not shown) of the application 112. As shown above, the example SQL statement comprises a database command (i.e., select), identification of a table (i.e., users), a table column (i.e., ssn), and content "@x", which is a parameterized value corresponding to "123-45-6789."

Data included in the database statement 120 and data stored in the database 109, including user records 132, may be vulnerable to unauthorized access or modification. For example, malicious software running on the database server 108 may delete user records 132 or transmit the user records 132 to a third party, such as attacker 101'. Although encrypted data 133 may be copied or deleted, the encrypted data 133 cannot be decrypted and viewed by an unauthorized party with access to the database server 108. Indeed, the cryptographic keys for decrypting the encrypted data 133 are never revealed to the untrusted machine 142.

An attacker 101' can use various methods to gain unauthorized access to the database 109. For example, the attacker 101' can "probe" the application 112 by submitting various query terms into the input field 116 to see how the application 112 behaves in response. For example, the attacker 101' can enter a single quotation mark into the input field 116 and then actuate the submit button 118. If the application 112 is properly implemented, the single quotation mark entered into the input field 116 can be properly handled or escaped. If the application 112 is not properly implemented to escape the single quotation mark, the database server 108 would find a parsing error in the database statement 120 and indicate accordingly to the application server 106. In turn, the application 112 can indicate to the attacker 101' that a failure to execute the database statement 120 is encountered. The indication can inform the attacker 101' that the application 112 is vulnerable to the input, and application 112 is thus vulnerable to create database statements 120 not anticipated or intended by the application creator. By exploring such vulnerability via injection attacks, an attacker 101' can operate on the database 109, including by installing malicious software via the application even though the attacker 101' does not have access to the database 109. Several embodiments of the disclosed technology can at least reduce or even prevent such unauthorized access to the database 109 by implementing expression evaluation regulation as described in more detail below.

In accordance with embodiments of the disclosed technology, the application 112 can include a security module configured to sign the database statement 120 using a suitable signing algorithm, such as the Digital Signature Algorithm (DSA), developed by the National Institute of Standards and Technology. The cryptographic key used for signing the database statement 120 may comprise a private key of an asymmetric public/private key pair generated by the security module of the application 112. The application 112 may be configured to distribute the public key of the key pair and information related to the signing algorithm to the trusted machine 146 for verifying the signature of the signed statement 120. The security module can be configured to generate a signature based on the private key and the database statement. In some embodiments, the database statement 120 includes metadata and the security module signs the database statement and the metadata, generating one signature. In other embodiments, the security module signs metadata separately from the database statement 120, generating a metadata signature included in the database statement 120. In some embodiments, to create the digital signature, the security module can create a one-way hash of the database statement 120 and use the private cryptographic key to encrypt the hash value. The encrypted hash value, along with other information, such as the hashing algorithm, may comprise the digital signature of the database statement 120.

As shown in FIG. 1A, the application 112 can also be configured to encrypt restricted data in the database statement 120 prior to the application 112 transmitting the restricted data over the computer network 104. The application 112 can be configured to identify whether data for the database statement 120, such as the user input submitted via the input field 116 by the user 101, is restricted. In some embodiments, the application 116 can determine whether data being transmitted is restricted based on a data type of the data. For example, a data type for the input field 116 can be "social security number," a known restricted data type. In other embodiments, the application 116 can determine whether data is restricted by association with the input field 116, indication by the user 101, or other suitable criteria.

The security module can then encrypt data that the application 112 has determined as restricted data. The application 112 and the trusted machine 146 can participate in a cryptographic key exchange, for example, during an initialization process for the trusted machine 146. As discussed further below, the cryptographic key exchange can result in the trusted machine 146 gaining access to a column encryption key (CEK) used for encrypting and decrypting data of a column of a table in the database 109. As an example, a suitable key exchange procedure comprises a Diffie-Hellman key exchange. The security module of the application 112 can encrypt data in the database statement 120 using the CEK prior to the application 112 transmitting the database statement 120 to the database server 108.

The database server 108 can be configured to facilitate access to the database 109. In the illustrated embodiment, the database server 108 is directly coupled to the database 109. In other embodiments, the database server 108 can facilitate access to the database 109 hosted in a cloud computing facility, a local computing facility, or other suitable facilities. The database 109 can include data in tables containing, for example, user records 132. The user records 132 are example records including information to facilitate certain designed functions of the application 112. In other embodiments, the database 109 can also contain usage records, tax information, pricing records, purchase history records, or other records containing any suitable types of information. As shown in FIG. 1A, the database 109 can store encrypted records 133 in the user records 132. For example, encrypted records may comprise restricted column ssn, for containing values of customer social security numbers.

As shown in FIG. 1A, the database server 108 can include one or more processors coupled to a memory containing instructions executable by the one or more processors to cause the processors to provide certain functional components. For example, as shown in FIGS. 1A-1F, the database server 108 can include an untrusted machine 142 interconnected with the database 109 and the trusted machine 146. In one embodiment, all of the foregoing functional components can reside on a single computing device (e.g., the database server 108). In other embodiments, the components can also reside on a plurality of distinct computing devices such as servers in a datacenter. In further embodiments, the components may also include network components and/or other suitable modules or components (not shown). In yet further embodiments, at least one of the foregoing components (e.g., the trusted machine 146) can reside on another server separate from the database server 108. In some embodiments, the trusted machine 146 resides in a protected processing environment that is secure from the untrusted machine 142.

As shown in FIG. 1A, the untrusted machine 142 can include an interface component 143 and a database component 144 operatively coupled to one another. The interface component 143 can be configured to receive the database statements 120 from the application 112. As shown in FIG. 1E, the interface component 143 can also be configured to provide query results 126 to the application 112, which have been generated based on the user records 132 in the database 109 in response to the database statement 120. In certain embodiments, the interface component 143 can include a network interface module with suitable firmware or software to perform the foregoing operations. In other embodiments, the interface component 143 can include other suitable types of communications modules.

Referring back to FIG. 1A, the database component 144 can be configured to process the received database statements 120 by the interface component 143. For example, the database component 144 can be configured to retrieve certain user records 132 identified based on the database statement 120. The database component 144 can also be configured to create, update, delete, or otherwise manipulate the user records 132 in the database 109. The database component 144 can further be configured to evaluate expressions. The database component 144 can be configured to compile database statement 120 to identify expressions for evaluation and evaluate those expressions if the expression do not involve encrypted data. For example, the database component 144 may compile the database statement 120, identifying a query and subqueries to evaluate the query.

The database component 144 can also be configured to determine whether the database statement 120 includes an expression comprising encrypted content, such as encrypted records 133, and, if so, to pass the expression and the encrypted content to the trusted machine 146 for evaluation. For example, the database component 144 can be configured to pass any expression 122 (shown in FIG. 1D) to the trusted machine 146 for processing when the expression comprises content that references an encrypted column of the database 109. The database component 144 can be configured to process or store the result 124 (shown in FIG. 1E) of the evaluation of the expression by the trusted machine 146. For example, the database component 144 can store a result in the database 109 and/or provide the result to the interface component 143 to transmit to the application 112.

As shown in FIG. 1A, the trusted machine 146 can include a cryptography module 155, a compiler 156, and a statement processor 157 operatively coupled to one another. Though particular components of the trusted machine 146 are shown in FIGS. 1A-1F, in other embodiments, the trusted machine 146 may include additional and/or different components. For example, the trusted machine 146 may comprise an interface component (not shown) configured to interface with the untrusted machine 142 and/or the application 112. An example interface component can include a network interface module with suitable firmware or software to perform the foregoing operations.

The cryptography module 155 can be configured to encrypt and decrypt restricted data using a cryptographic key exchanged with the application 112 in a key exchange procedure. In some embodiments, the cryptography module 155 is configured to commence a key exchange procedure with the application 112 in response to receiving an indication from the application 112, via the untrusted machine 142, that the application 112 would like to transmit a database statement including encrypted content to the untrusted machine 142. For example, the application 112 may be configured to generate the database statement 120 including a shell of a query by parameterizing the restricted contents of a query. The application 112 may then transmit the database statement 120 to the untrusted machine 142 and request that the untrusted machine 142 to compile the database statement 120. In response to receiving the database statement 120 comprising the parameterized contents, the untrusted machine 142 can be configured to request that the trusted machine 146 process the database statement. In response to receiving the request from the untrusted machine 142 to process the database statement 120, the trusted machine 146 can be configured to commence a cryptographic key exchange procedure with the application 112 if no keys yet exist. The cryptography module 155 and the application 112 can then exchange cryptographic keys using a Diffie-Hellman Key Exchange or other suitable exchange procedures.

In some embodiments, the cryptography module 155 can be configured to create a Column Encryption Key (CEK) for encrypting and decrypting column values and a Master Encryption Key (MEK) for securing the CEK. In some embodiments, the CEK is a symmetric key and the MEK is an asymmetric key. The cryptography module 155 may store an encrypted CEK and offload management of the MEK to an external entity, such as a Key Store Provider (not shown) that is configured to authenticate and provide access control for the MEK. In some embodiments, the cryptography module 155 stores and has access to MEK metadata which allows the cryptography module 155 to access the MEK. For example, MEK metadata may include a key path, a key name, and a Key Store Provider name. The cryptography module 155 can be configured to encrypt (or decrypt) a CEK given plaintext (or ciphertext) of the CEK, a key path, a key name, and a Key Store Provider. The cryptography module 155 can be configured to provide the ciphertext of the CEK and the MEK metadata to the application 112, enabling the application to access the MEK at the Key Store Provider using the MEK metadata, in order to decrypt the CEK and use the CEK for encrypting or decrypting restricted data. In some embodiments, the application 112 is configured to generate the CEK, encrypt the CEK using a public key of the trusted machine 146 known to the application 112, and transmit the encrypted CEK to the trusted machine 146, which can then decrypt the CEK using a private key associated with the public key.

Figure 1B:
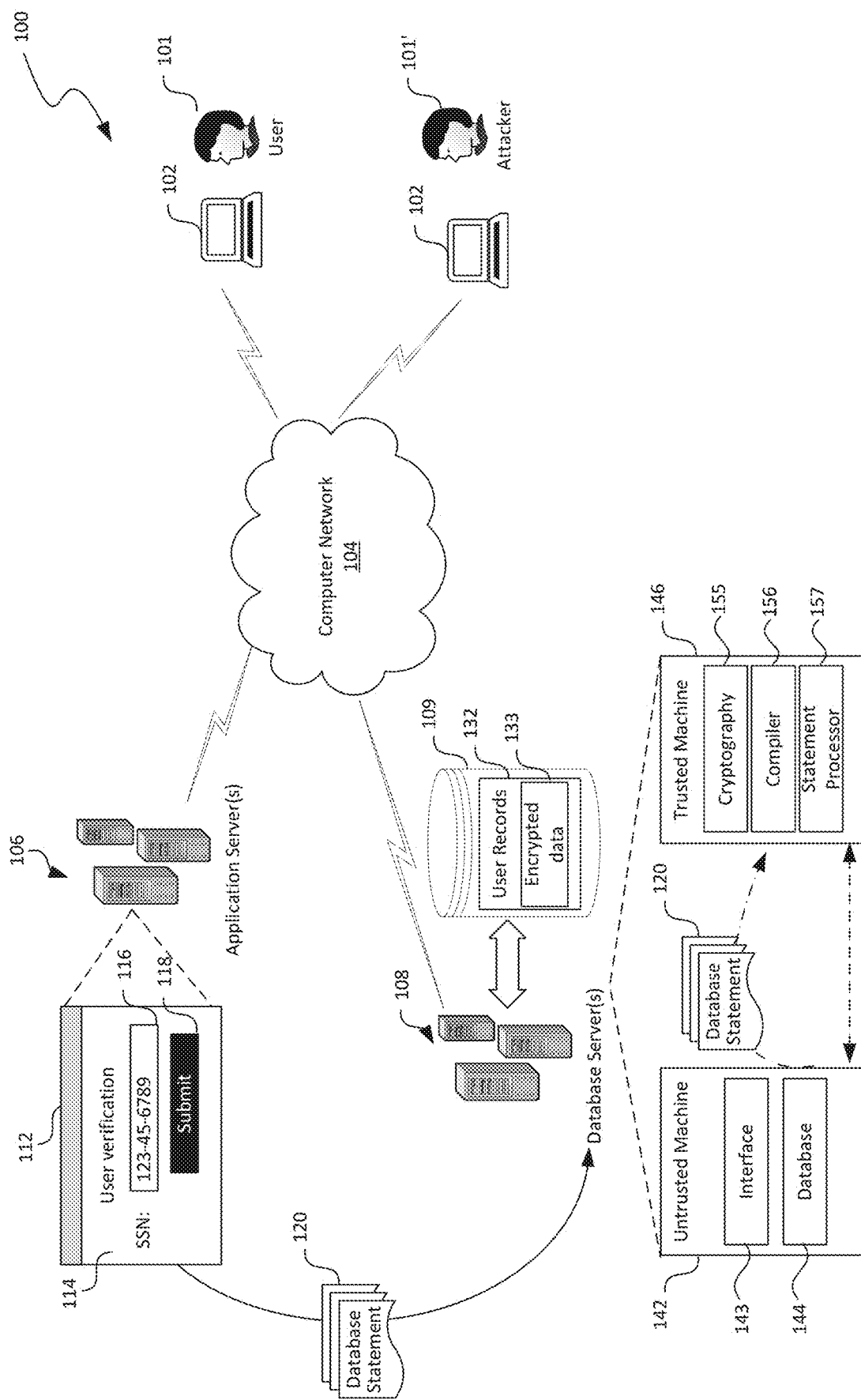

In certain embodiments, as shown in FIG. 1B, the cryptography module 155 can also be configured to verify the authenticity of the signed statement using a signature verification algorithm and the public key provided by the application 112. For example, the trusted machine 146 may receive the public key of the public/private key pair generated by the application 112. The trusted machine 146 may also receive an indication of the signing algorithm used by the application to sign the database statement 120. The indication of the signing algorithm may be included in the digital signature of the database statement 120. For example, the cryptography module 155 can be configured to use a signature verifying procedure of the DSA to verify the authenticity of the database statement 120. In some embodiments, the cryptography module 155 is configured to verify the signature of the database statement 120 by computing a hash value of the database statement 120 using the hashing algorithm used by the application 112 to generate the digital signature, decrypting the digital signature using the public key received from the application 112, and comparing the decrypted digital signature with the computed hash of the database statement. When the decrypted digital signature matches the computed hash of the database statement, the cryptography module 155 may indicate that that the database statement is authentic. In other embodiments, the cryptography module 155 can be configured to verify the authenticity of the signed statement using a symmetrical key or other suitable techniques. The database statement 120 can include metadata, such as a column name or a superkey name for a database. In some embodiments, the signed database statement 120 may include a signature generated by signing the database statement 120 and the metadata. In such an embodiment, the cryptography module 155 can be configured to verify the authenticity of the database statement 120 and metadata using a signature verifying procedure and the digital signature. In other embodiments, metadata is signed separately from the database statement 120, and the signed database statement 120 includes a metadata signature. In such an embodiment, the cryptography module 155 can be configured to use a signature verifying procedure to verify the authenticity of the metadata using the metadata signature.

Figure 1C:
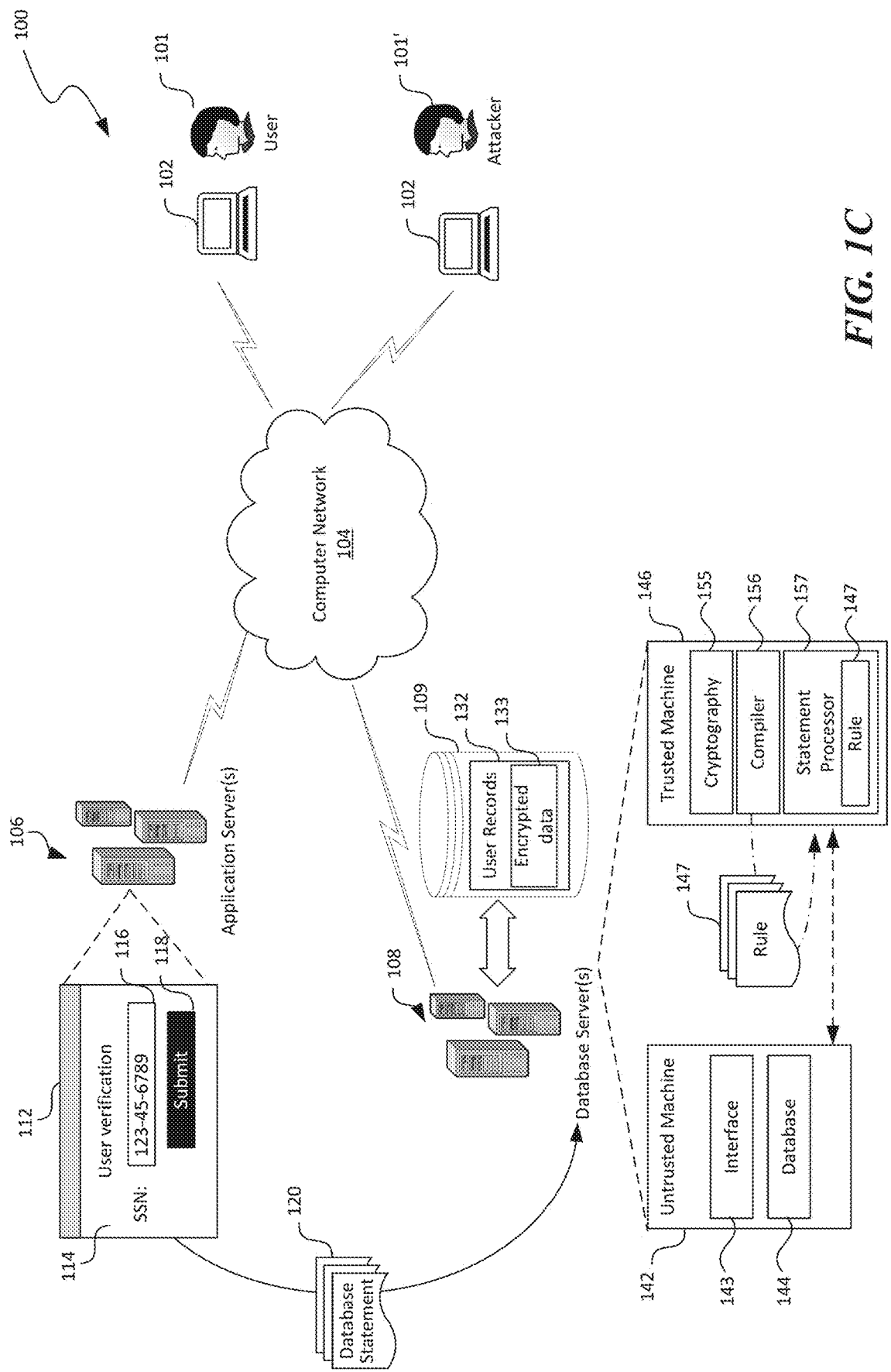

As shown in FIG. 1C, upon verification of the authenticity of the database statement 120 by the cryptography module 155, the compiler 156 of the trusted machine 146 can be configured to compile the database statement 120 and create a rule 147 for regulating expression evaluation by the statement processor 157. In some embodiments, the rule 147 comprises any approved expression(s) of the database statement 120. For example, the rule 147 may comprise an operator (e.g., compare) that the statement processor 157 is permitted to compute with respect to an expression for the database statement 120. The following is the example database statement 120 discussed above:

select*from users where ssn like @x;

and an associated rule 147 may indicate that, for the database statement 120, the statement processor 157 is only permitted to evaluate the like operator with regard to the predicate comparing the ssn column to the parameterized value @x, when requested by the untrusted machine 142 to evaluate an untrusted expression of the database statement 120. In some embodiments, the rule 147 comprises metadata of the database statement 120, or is determined based on the metadata. For example, metadata of the database statement 120 may include an identified column for an approved expression, and the rule 147 may include that expressions can only be evaluated for the database statement with respect to the identified column.

Figure 1D:
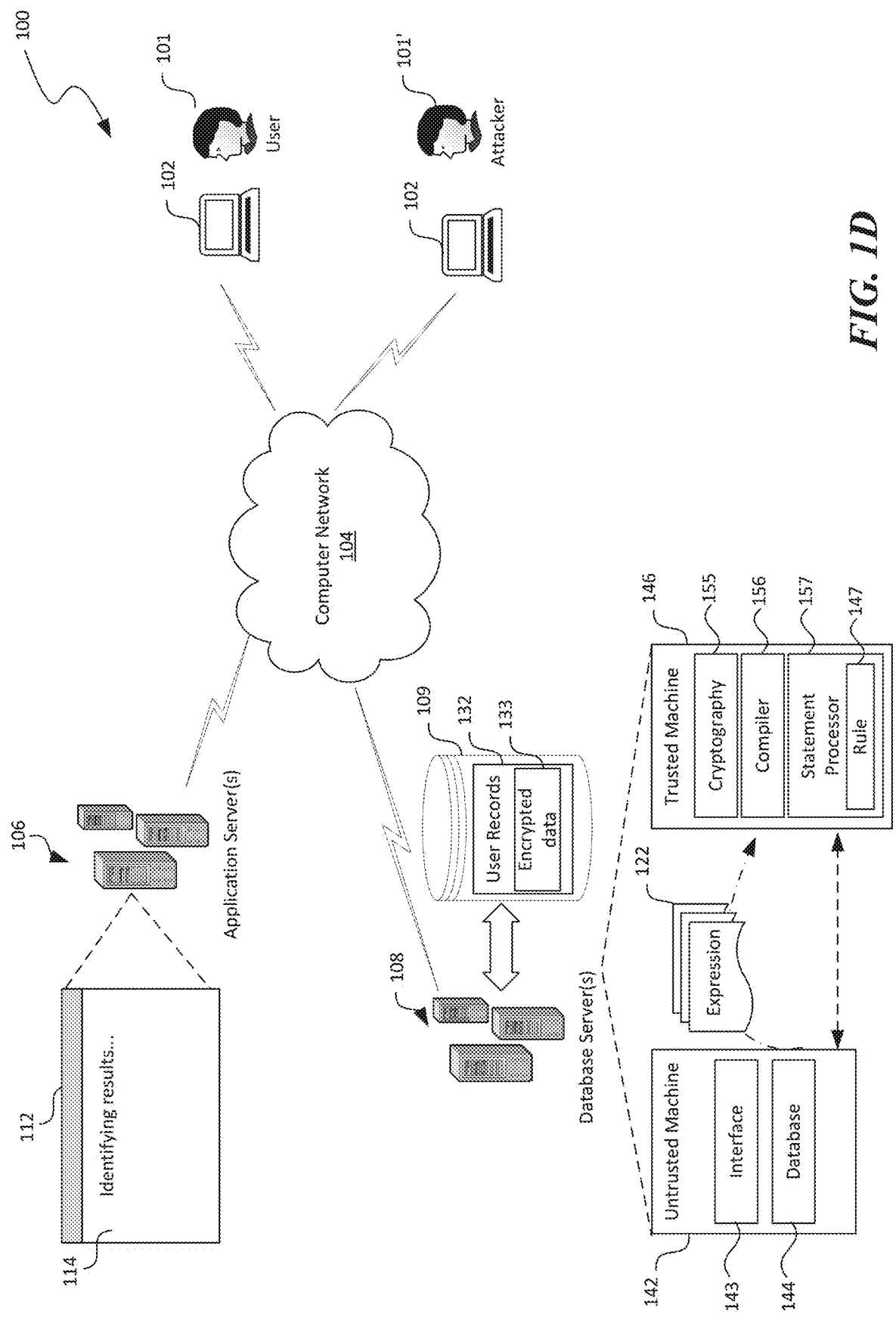
Figure 1E:
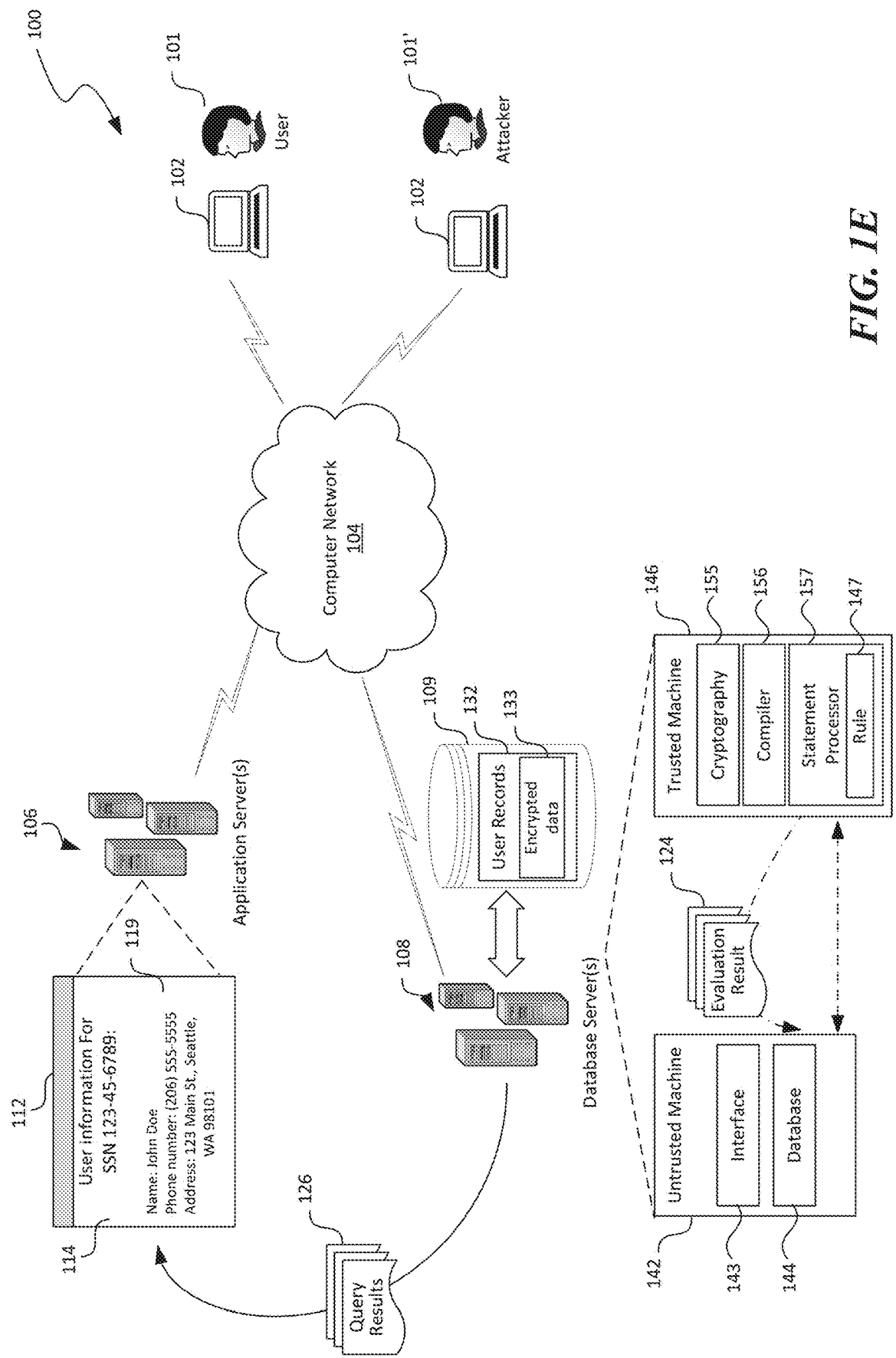

As shown in FIG. 1D, when the trusted machine 146 receives an untrusted expression 122 from the untrusted machine 142 for evaluation. The statement processor 157 can be configured to evaluate the untrusted expression 122 when the untrusted expression meets the rule 147. Prior to evaluating the untrusted expression 122, the statement processor 157 can be configured to compare the rule 147 with the untrusted expression 122 to determine whether the untrusted expression 122 meets the rule 147. In some embodiments, the rule 147 comprises an approved expression and the untrusted expression 122 meets the rule 147 when the untrusted expression 122 matches the approved expression. For example, the statement processor 157 can be configured to determine that the untrusted expression 122 matches the approved expression when an operator of the untrusted expression 122 matches an operator of the approved expression. In some embodiments, the statement processor 157 is configured to only execute an operation included in the rule 147 and abstain from executing another operation for the database statement 120. In some embodiments, the statement processor 157 is configured to only evaluate an expression that is approved of in metadata associated with the database statement 120. For example, the rule 147 may include a superkey name or a column name included in signed metadata associated with the database statement 120, with respect to which an expression may be evaluated.

In response to determining that the untrusted expression 122 meets the rule 147, the statement processor 157 can be configured to evaluate the untrusted expression 122. The statement processor 157 can be configured to perform a variety of operations for evaluating the untrusted expression 122. In some implementations, the statement processor 157 is configured to perform conventional database server operations for expression evaluation. For example, the statement processor 157 may process operators like, between, <, < >, and so on. In some embodiments, the statement processor 157 is configured to perform other database server functionality beyond expression evaluation. For example, in some implementations, the statement processor 157 is configured to store and retrieve encrypted data in a table that the statement processor 157 maintains in a data storage area (not pictured).

For evaluating the untrusted expression 122, the statement processor 157 can receive decrypted data from the cryptography module 155. As such, the untrusted machine 142 may be configured to provide encrypted content of the untrusted expression 122 for evaluating the untrusted expression 122. The encrypted content may comprise encrypted data 133 of the user records 132 and/or an encrypted parameter value of the database statement 120. For example, referring to the example database statement above, the statement processor 157 may evaluate "ssn like @x," by comparing parameter, @x, whose value is encrypted when received by the trusted machine 146, with values of the ssn column of the table users, which are also encrypted. The encrypted data can be provided to the cryptography module 155, which decrypts the encrypted data and provides the data in plaintext to the statement processor 157 for evaluation according to the untrusted expression 122.

Referring to FIG. 1E, the statement processor 157 can be configured to then generate an evaluation result 124 by evaluating the untrusted expression 122 and provide the evaluation result 124 to the untrusted machine 142 for further processing. In response to receiving the evaluation result 124, the untrusted machine 142 can be configured to generate query results 126. The query results 126 may include the evaluation result 124 and/or user records 132 identified using the evaluation result 124. For instance, in response to the example SQL statement, "select*from users where ssn like @x," where @x is a parameter for cyphertext of ssn value 123-45-6789, the evaluation result 124 may comprise cyphertext corresponding to a value from column ssn that matches ssn value 123-45-6789, as determined by the trusted machine. In response to receiving the evaluation result 124, the untrusted machine may be configured to search user records 132 based on the evaluation result 124, identify a row in user records 132 including the evaluation result 124 in the ssn column, and generate the query results 126 comprising values in the identified row. In response to receiving the query results 126, the application 112, can be configured to display user information 119 from the user records 132 to the user 101. In the illustrated embodiment, the displayed user information 119 is shown to include a name (i.e., "John Doe"), a phone number (i.e., "(206) 555-5555"), and an address (i.e., "123 Main St., Seattle, Wash. 98101") for illustration purposes. In other embodiments, the displayed information 119 can also include any other suitable types of information. The application 112 can be configured to decrypt data in the query results 126 when the query results 126 are encrypted. For example, query results may include encrypted data 133 from an encrypted column or an encrypted value that is the evaluation result 124 received from the trusted machine 142. In some embodiments, the application may be configured to decrypt the data using the CEK.

Figure 1F:
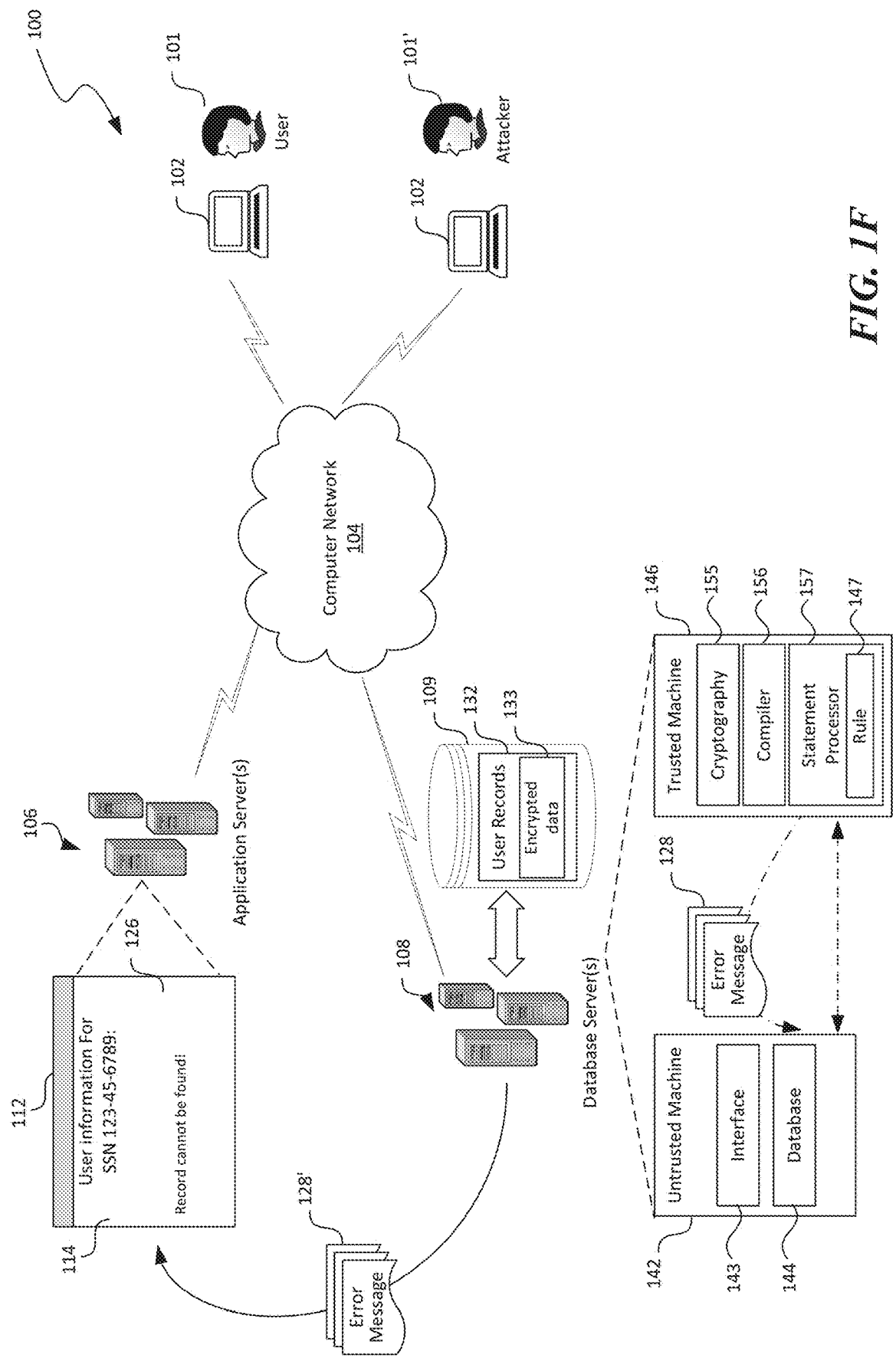

In response to determining that the untrusted expression 122 does not meet the rule 147, the statement processor 157 can be configured to refrain from encrypting certain results and instead provide the untrusted machine 142 with an error message 128, as shown in FIG. 1F. For example, the rule 147 may comprise an approved operator that is permitted for a predicate of the database statement 120, and the untrusted expression 122 may include an operator for the predicate that is different from the approved operator. In response to the untrusted expression 122 not meeting the rule 147, the statement processor 157 can be configured to generate the error message 128. In turn, the trusted machine 146 can be configured to generate another error message 128' and transmit the error message 128' to the application 112 for outputting to the user 101.

Several embodiments of the disclosed technology can thus reduce or even prevent performing unauthorized operations on encrypted data in the trusted machine 146 by verifying the authenticity of the received database statement 120. The trusted machine 146 can verify that the received database statement 120 is authentic based on, for instance, the digital signature included with the database statement. By verifying the digital signature, the compiler can then indicate to the statement processor whether to evaluate any untrusted expression 122 (FIG. 1D) when received from the untrusted machine 142 for evaluation. As such, the statement processor 157 may avoid processing unauthorized expressions or commands to the encrypted data, thus improving data security in the database 109.

Figure 2A:
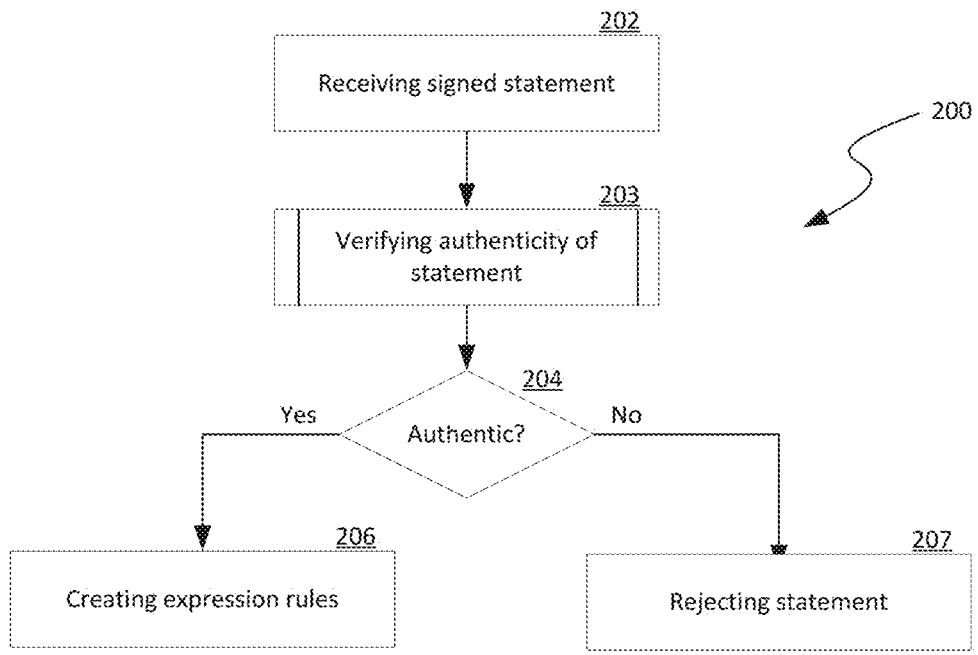
FIGS. 2A-2B are flowcharts illustrating various processes for creating expression evaluation rules for implementing expression evaluation regulation in accordance with embodiments of the disclosed technology.
Figure 2B:
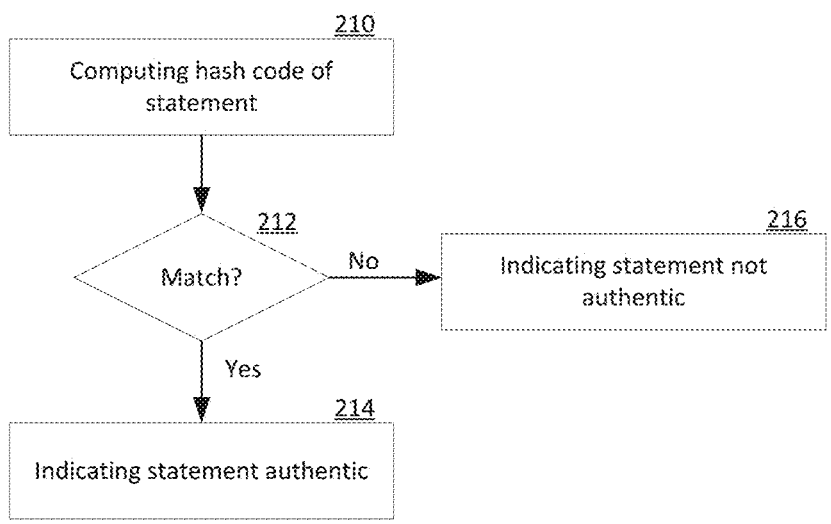

FIGS. 2A-2B are flowcharts illustrating various processes of evaluating expressions involving restricted data in accordance with embodiments of the disclosed technology. Even though various embodiments of the processes are described below with reference to the computing system 100 of FIGS. 1A-1E, in other embodiments, the processes can also be performed with other suitable types of computing frameworks, systems, components, or modules.

As shown in FIG. 2A, a process 200 can include receiving a signed database statement at stage 202. In certain embodiments, the signed database statement includes a database statement generated by an application based at least in part on user input and a digital signature purportedly generated by the application. In other embodiments, the signed statement includes a signature and approved expressions of a database statement and not the entire database statement. The process 200 can then include verifying authenticity of the statement at stage 203. In certain embodiments, a public key for the application is used for verifying that the signed statement is authentic as being generated by the application. For example, a signature verifying algorithm can be used for verifying, based on the public key for the application, the signature and the database statement, whether the signature is valid. An example of verifying the authenticity of the database statement is described in more detail with respect to FIG. 2B.

The process 200 can then include a decision stage 204 to determine whether the signed statement is authentic for the application. In response to determining that the signed statement is not authentic, the process 200 proceeds to rejecting the statement at stage 207. In some embodiments, when a statement is rejected, a rule is created to not evaluate any expressions of the database statement that include encrypted data. In some embodiments, when a statement is rejected, no rules are created for evaluating expressions with respect to the statement. In response to determining that the statement is authentic, the process 200 proceeds to creating expression rules at stage 206. Expression rules are created based at least in part on approved expressions identified in compiling the statement.

FIG. 2B illustrates example operations of verifying the authenticity of a signed database statement at stage 203 of FIG. 2A. As shown in FIG. 2B, operations include computing a hash code of the database statement at stage 210. The hash code can be computed using a hashing algorithm used by the application to generate the digital signature. The operations include a decision stage 211 for determining whether the computed hash code matches the decrypted signature of the signed database statement. For example, the digital signature of the signed statement can be decrypted using the public key associated with the application. When the computed hash code and the decrypted signature of the signed database statement do not match, the operations include indicating that the statement is not authentic at stage 216. In some embodiments, indicating that the statement is not authentic comprises generating an error code. When the computed hash code of the database statement matches the decrypted digital signature of the signed database statement, the operations include indicating that the statement is authentic at stage 214.

Figure 3:
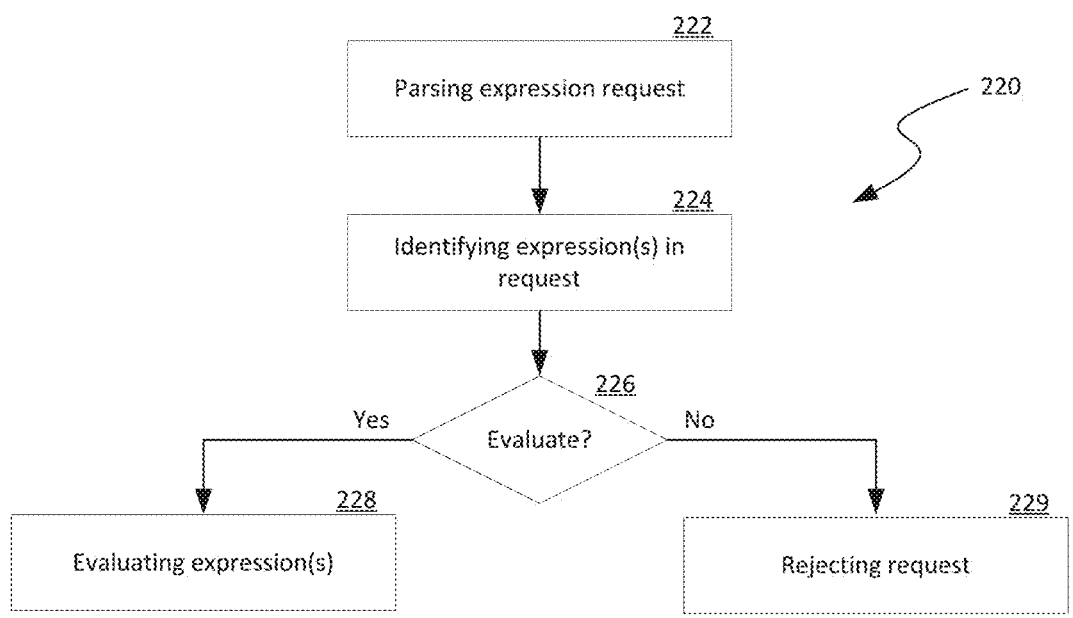
FIG. 3 is a flowchart illustrating various processes for evaluating an expression comprising encrypted data by a trusted machine in accordance with embodiments of the disclosed technology.

FIG. 3 illustrates example operations of evaluating expressions by a trusted machine in response to a request by an untrusted machine to evaluate the expressions. A process 220 includes parsing a received expression(s) request at stage 222, in response to receiving the request from the untrusted machine. The operations include identifying expression(s) in the request as a result of the parsing. The operations include a decision stage 226 for determining whether to evaluate the identified expression(s). The expression(s) can be compared to expression rules, and operations include when the identified expressions do not meet the expression rules, rejecting the request to evaluate the expression(s) at stage 229. The operations include evaluating the expressions at stage 228 when the expression(s) meet the expression rules.

Figure 4:
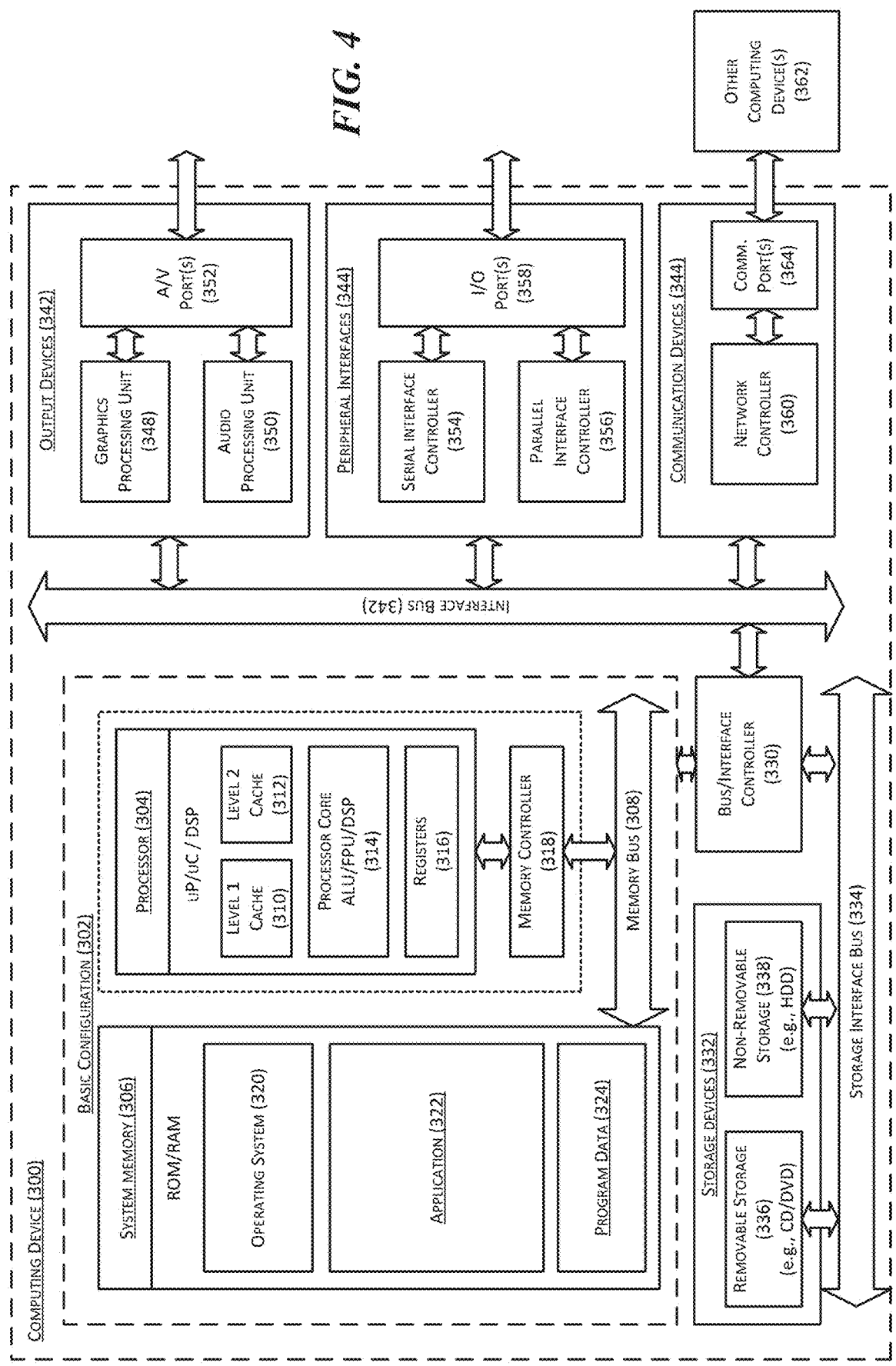
FIG. 4 is a computing device suitable for certain components of the computing system in FIGS. 1A-1F.

FIG. 4 is a computing device 300 suitable for certain components of the computing system 100 in FIGS. 1A-1F. For example, the computing device 300 can be suitable for the application server 106, the database server 108, or the client devices 102 of FIGS. 1A-1F. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for evaluating expressions in a protected computing environment on a computer also having an unprotected computing environment, the method comprising:

receiving, via a computer network, data representing a database statement from an application, the database statement including an attached digital signature;

determining, using the digital signature of the database statement, whether the received database statement is authentic as being actually generated by the application;

in response to determining that the database statement is authentic, identifying an expression having a database operation in the received database statement;

generating an expression rule based at least in part on the identified expression in the received database statement, the expression rule containing data indicating that, among expressions received from the unprotected computing environment, only those containing the database operation are to be evaluated in the protected computing environment; and restricting evaluation of expressions in the protected computing environment according to the generated expression rule, thereby preventing evaluation of other expressions unauthorized by the application in connection with the received database statement.

2. The method of claim 1 wherein:

the digital signature includes a hash value of the received database statement; and determining whether the received database statement is authentic further includes:

calculating another hash value of the received database statement;

determining whether the calculated another hash value matches the hash value of the digital signature; and in response to determining that the calculated another hash value matches the hash value of the digital signature, indicating that the database statement is authentic.

3. The method of claim 1 wherein restricting evaluation of the expressions includes restricting evaluation of expressions to only those containing the database operation or abstaining from evaluating any of the expressions not containing the database operation.

4. The method of claim 1 wherein:

receiving the data representing the database statement includes receiving the data representing the database statement and metadata associated with the database statement, the metadata having another digital signature; and determining whether the received database statement is authentic includes determining whether the receiving database statement is authentic based on both the digital signature of the database statement and the another digital signature of the metadata associated with the database statement.

5. The method of claim 1 wherein restricting evaluation of expressions includes:

receiving a request to evaluate an expression in connection with the received database statement, wherein the expression comprises content that is encrypted;

determining whether the expression satisfies the generated expression rule; and in response to determining that the expression satisfies the generated expression rule, decrypting the content that is encrypted in the protected computing environment; and evaluating the expression using the decrypted content.

6. The method of claim 1 wherein restricting evaluation of expressions includes:

receiving a request to evaluate an expression in connection with the received database statement, wherein the expression comprises content that is encrypted;

determining whether the expression includes a database operation matches the database operation of the expression rule; and in response to determining that the expression includes a database operation matches the database operation of the expression rule, decrypting the content that is encrypted in the protected computing environment; and evaluating the expression using the decrypted content.

7. The method of claim 1 wherein restricting evaluation of expressions:

receiving a request to evaluate an expression in connection with the received database statement, wherein the expression comprises content that is encrypted;

determining whether the expression satisfies the generated expression rule; and in response to determining that the expression does not satisfy the generated expression rule, abstaining from evaluating the expression and providing an error message in response to the received request.

8. The method of claim 1 wherein restricting evaluation of expressions:

receiving a request to evaluate an expression in connection with the received database statement, wherein the expression comprises content that is encrypted;

determining whether the expression includes a database operation matches the database operation of the expression rule; and in response to determining that the expression includes a database operation that is different from the database operation of the expression rule, abstaining from evaluating the expression and providing an error message in response to the received request.

9. A method performed by a computer for evaluating expressions in a protected computing environment, the method comprising:

receiving an expression rule containing data indicating that only expressions containing a database operation are to be evaluated in connection with a database statement in the protected computing environment, the expression rule being generated based on verification of a digital signature of the database statement; and receiving a request to evaluate an expression in connection with the database statement, the expression containing encrypted data; and in response to receiving the request, determining whether the expression satisfies the expression rule; and in response to determining that the expression satisfies the expression rule, decrypting the encrypted content of the expression in the protected computing environment;

evaluating the expression using the decrypted content to generate an evaluation result in the protected computing environment; and providing the evaluation result in response to the received request.

10. The method of claim 9, further comprising:

in response to determining that the expression does not satisfy the expression rule, preventing evaluation of the expression in the protected computing environment; and providing an error message in response to the received request.

11. The method of claim 9 wherein:

receiving the request includes receiving a request to evaluate whether two encrypted strings match each other; and determining whether the expression satisfies the expression rule includes:

determining whether compare is the database operation included in the expression rule; and in response to determining that compare is the database operation included in the expression rule,
decrypting the two encrypted strings in the protected computing environment;
performing a comparison of the decrypted strings; and
based on the comparison, indicating that the two encrypted strings match each other when the two decrypted strings match each other.

12. The method of claim 9 wherein:
receiving the request includes receiving a request to evaluate whether two encrypted strings match each other; and
determining whether the expression satisfies the expression rule includes:
determining whether compare is the database operation included in the expression rule; and
in response to determining that compare is the database operation included in the expression rule,
decrypting the two encrypted strings in the protected computing environment;
performing a comparison of the decrypted strings; and
based on the comparison, indicating that the two encrypted strings do not match each other when the two decrypted strings do not match each other.

13. The method of claim 9 wherein:
receiving the request includes receiving a request to evaluate whether two encrypted strings match each other; and
determining whether the expression satisfies the expression rule includes:
determining whether compare is the database operation included in the expression rule; and
in response to determining that compare is not the database operation included in the expression rule, preventing decryption and comparison of the encrypted strings in the protected computing environment.

14. A computing device, comprising:
a processor; and
a memory containing instructions executable by the processor to provide a protected computing environment and an unprotected computing environment, the memory containing additional instructions executable by the processor to cause the computing device to:
in response to receiving, via a computer network, data representing a database statement from an application, determine whether the received database statement is authentic using a digital signature of the database statement in the protected computing environment; and
in response to determining that the database statement is authentic, generate an expression rule containing data indicating that only expressions containing one or more database operations included in the database statement are to be evaluated in the protected computing environment; and
prevent evaluation of expressions received from the unprotected computing environment according to the generated expression rule in the protected computing environment, the expressions received from the unprotected computing environment do not contain the one or database operations indicated in the expression rule.

15. The computing device of claim 14 wherein:
the digital signature includes a hash value of the received database statement; and
to determine whether the received database statement is authentic includes:
to calculate another hash value of the received database statement;
to determine whether the calculated another hash value matches the hash value of the digital signature; and
in response to determining that the calculated another hash value matches the hash value of the digital signature, to indicate that the database statement is authentic.

16. The computing device of claim 14 wherein the memory contains further instructions executable by the processor to cause the computing device to allow evaluation of further expressions containing one or more of the database operations indicated in the expression rule.

17. The computing device of claim 14 wherein the memory contains further instructions executable by the processor to cause the computing device to:
receive, from the unprotected computing environment, a request to evaluate an expression in connection with the received database statement, wherein the expression comprises encrypted content;
determine whether the expression satisfies the expression rule; and
in response to determining that the expression satisfies the expression rule,
decrypt the encrypted content in the protected computing environment; and
evaluate the expression using the decrypted content.

18. The computing device of claim 14 wherein the memory contains further instructions executable by the processor to cause the computing device to:
receive, from the unprotected computing environment, a request to evaluate an expression in connection with the received database statement, wherein the expression comprises encrypted content;
determine whether the expression satisfies the expression rule; and
in response to determining that the expression does not satisfy the expression rule, prevent decryption of the encrypted content in the protected computing environment.

19. The computing device of claim 14 wherein the memory contains further instructions executable by the processor to cause the computing device to:
receive, from the unprotected computing environment, a request to evaluate an expression in connection with the received database statement, wherein the expression comprises encrypted content;
determine whether the expression includes a database operation that matches at least one of the one or more database operations indicated by the expression rule; and
in response to determining that the expression includes a database operation that matches at least one of the one or more database operations indicated by the expression rule,
decrypt the encrypted content in the protected computing environment; and
evaluate the expression using the decrypted content.

20. The computing device of claim 14 wherein the memory contains further instructions executable by the processor to cause the computing device to:
receive, from the unprotected computing environment, a request to evaluate an expression in connection with the received database statement, wherein the expression comprises encrypted content;

determine whether the expression includes a database operation that matches at least one of the one or more database operations indicated by the expression rule; and in response to determining that the expression does not include a database operation that matches at least one of the one or more database operations indicated by the expression rule, prevent decryption of the encrypted content in the protected computing environment.

* * * * *